R. L. PATE.
DEVICE FOR CONTROLLING THE TEMPERATURE OF AUTOMOBILE RADIATORS.
APPLICATION FILED MAY 20, 1919.
1,392,522.
Patented Oct. 4, 1921.
3 SHEETS—SHEET 1.
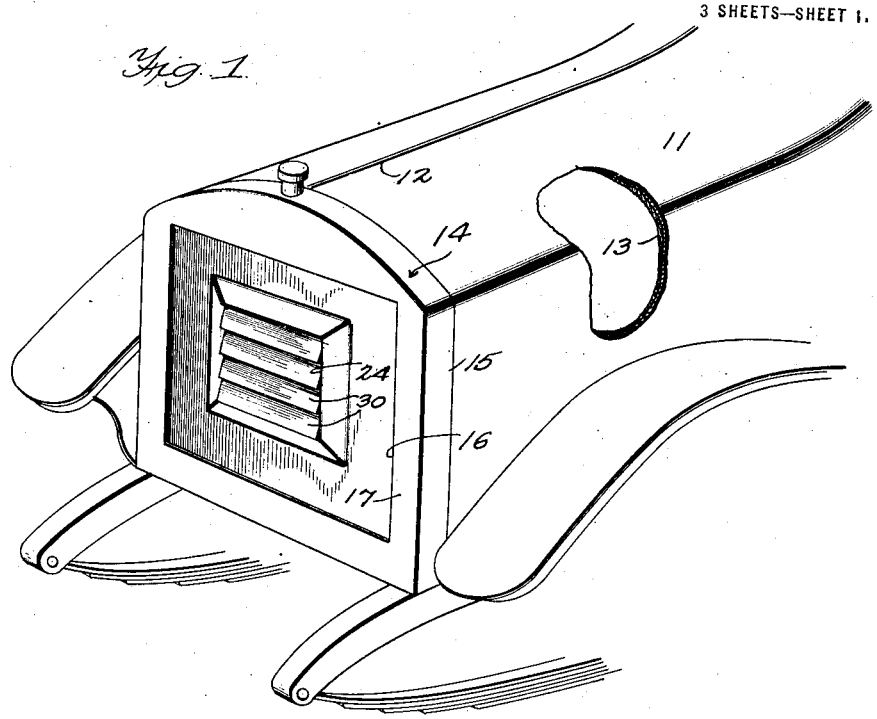
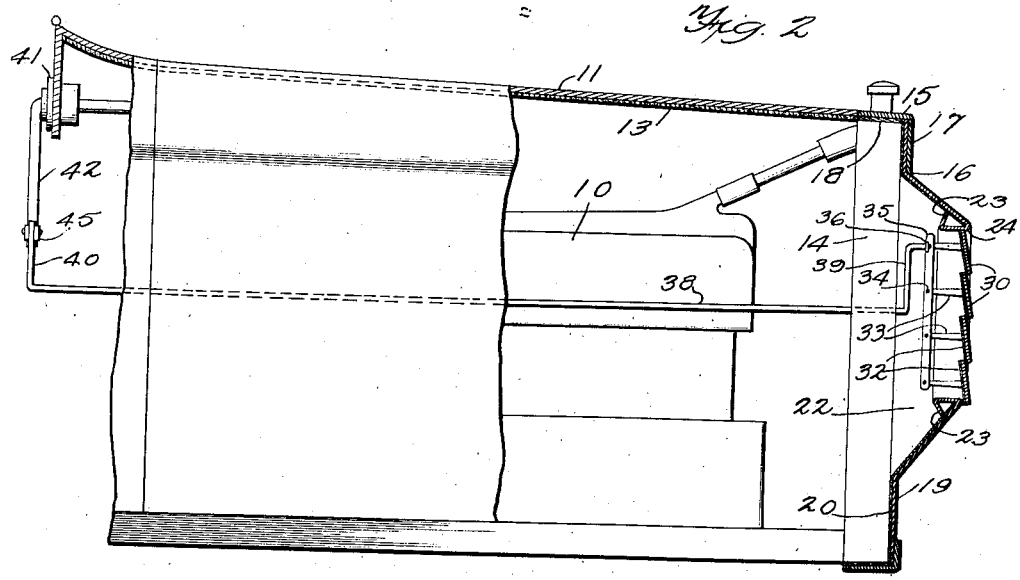
Inventor
Robert L. Pate
By C. L. Parker.
Attorney R. L. PATE.
DEVICE FOR CONTROLLING THE TEMPERATURE OF AUTOMOBILE RADIATORS.
APPLICATION FILED MAY 20, 1919.
1,392,522.
Patented Oct. 4, 1921.
3 SHEETS—SHEET 2.
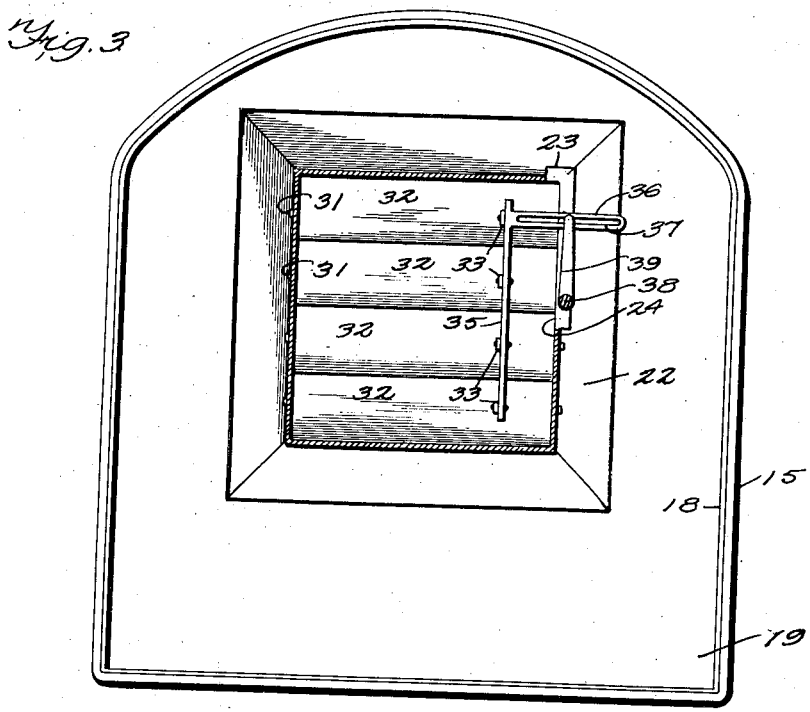
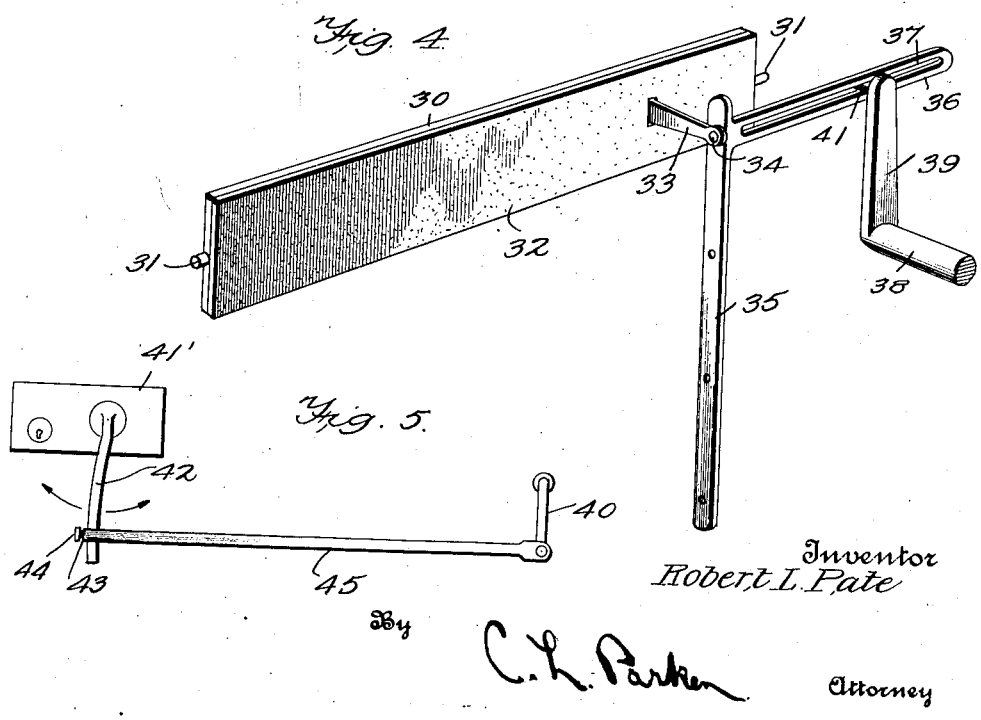
Inventor
Robert L. Pate
By C. L. Parker
Attorney R. L. PATE.
DEVICE FOR CONTROLLING THE TEMPERATURE OF AUTOMOBILE RADIATORS.
APPLICATION FILED MAY 20, 1919.

1,392,522.

Patented Oct. 4, 1921.

Inventor
Robert L. Pate,
By C. L. Parker
Attorney

UNITED STATES PATENT OFFICE.

ROBERT L. PATE, OF SPRINGFIELD, MISSOURI.

DEVICE FOR CONTROLLING THE TEMPERATURE OF AUTOMOBILE-RADIATORS.

1,392,522.  Specification of Letters Patent.  Patented Oct. 4, 1921.

Application filed May 20, 1919. Serial No. 298,519.

*To all whom it may concern:*

Be it known that I, ROBERT L. PATE, a citizen of the United States, residing at Springfield, in the county of Greene and State of Missouri, have invented certain new and useful Improvements in Devices for Controlling the Temperature of Automobile-Radiators, of which the following is a specification.

My invention relates to apparatus for use in connection with the radiator of an automobile or the like, for regulating the temperature of the same.

An important object of the invention is to provide apparatus of the above mentioned character, which is of simplified construction, and is adapted to be installed upon or used in connection with radiators of various types, shapes or sizes, by a simple cutting or alteration of the body portion of the apparatus.

A further object of the invention is to provide apparatus of the above mentioned character, which may be installed upon the ordinary radiator without altering the construction of the radiator, such apparatus fitting within the radiator shell or casing, at the forward side thereof.

A further object of the invention is to provide apparatus of the above mentioned character embodying a plurality of movable shutters, covered with heat insulating material, whereby the shutters when in the closed position, will not serve as a heat conductor from or toward the radiator.

A further object of the invention is to provide apparatus of the above mentioned character, adapted to form a heat insulating covering for the entire engine and radiator, thereby maintaining the temperature of the water jacket or cooling system, accurately at the desired degree.

Other objects and advantages of the invention will be apparent during the course of the following description.

In the accompanying drawings forming a part of this specification, and in which like numerals are employed to designate like parts throughout the same:

Figure 1 is a perspective view of apparatus embodying my invention:

Fig. 2 is a central vertical longitudinal section through the same;

Fig. 3 is an inner side elevation of the device, arranged within the radiator casing or shell;

Fig. 4 is a perspective view of one of the movable shutters, showing the operating means therefor;

Fig. 5 is a side elevation of the ignition switch lever and connections therewith for operating the movable shutters;

Figure 6:
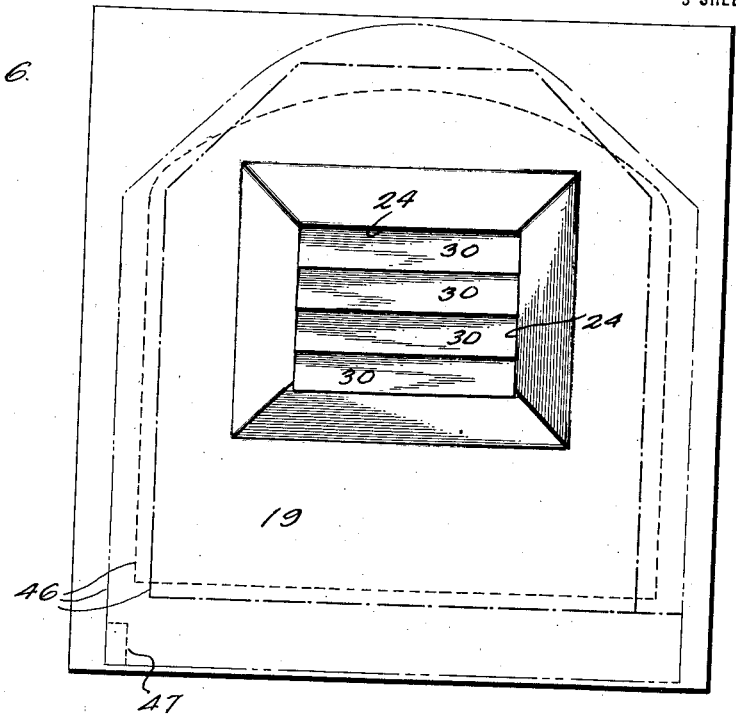
Fig. 6 is a side elevation of the radiator covering element, showing the body portion thereof marked for indicating the way in which such body portion is to be cut.
Figure 7:
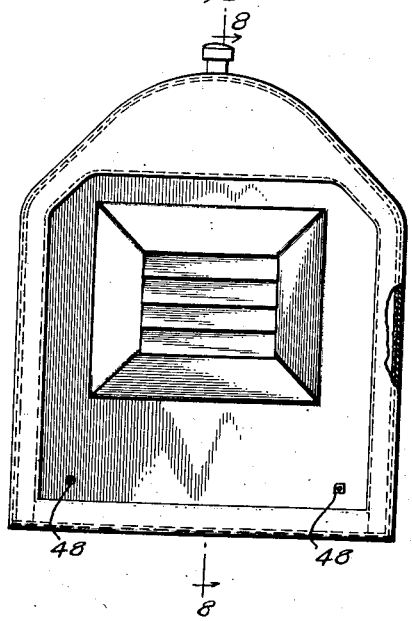
Fig. 7 is a front elevation of the radiator covering element, showing the same in use.
Figure 8:
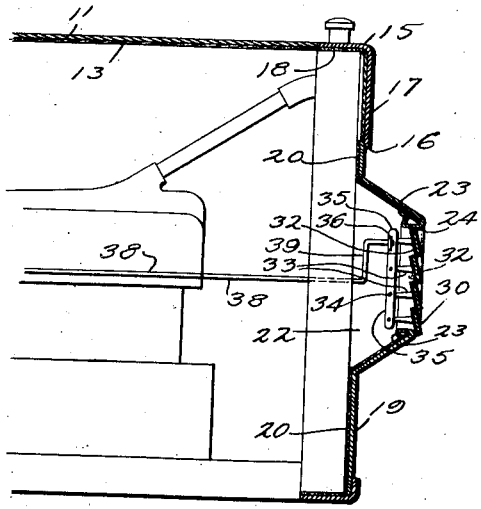
Fig. 8 is a transverse section, taken on line 8—8 of Fig. 7.

In the drawings, wherein for the purpose of illustration is shown a preferred embodiment of my invention, the numeral 10 designates the engine of an automobile of any well known or preferred type, and this engine is covered by the usual hood sections 11, which are hinged at their upper ends, at 12, whereby they may be conveniently opened for providing access to the engine. In order that the temperature of the engine or its jacket may be maintained at the desired degree, I preferably line the interior of the hood sections with a sheet of heat insulating material 13, which may be asbestos or any other suitable material. This insulating covering is secured to the inner surface of the hood sections 11 by any suitable means.

The numeral 14 designates the radiator of the automobile, embodying a shell 15, having the usual main forward opening 16, surrounded by a frame or flange 17. I preferably line the interior of the radiator shell or casing 15 with a sheet of heat insulating material 18, as shown.

The numeral 19 designates a cover sheet, formed of sheet metal or the like, and having its rear side covered with a sheet of heat insulating material 20, such as asbestos. This cover sheet has an outwardly bulging or extending casing or chamber 22, pressed or stamped therefrom. This outwardly bulging chamber is preferably located near the upper end of the cover sheet, while the invention is in no sense restricted to this particular location, as it may extend downwardly in proximity to the lower end of the cover sheet if desired. However, as it is ordinarily desirable to retain the lower end of the radiator permanently covered, it is found to be unnecessary to extend the chamber 29 downwardly at or to the lower end of the cover sheet. The insulating lining 20 also extends over the rear face of the chamber 22, and the edges thereof are engaged beneath a flange 23, which is rolled or otherwise formed upon the chamber 22. The chamber 22 is provided with a main opening 24, which is surrounded by the flange or bead 23 which serves to reinforce and stiffen the same. Particular attention is called to the fact that the flange 23 is hollow and is substantially triangular in cross section, thus providing the maximum degree of strength or stiffness.

Arranged within the main opening 24 are a plurality of shutters 30, provided at their ends with trunnions or pivot elements 31, preferably disposed in the central longitudinal axis of these shutters. The trunnions 31 are pivoted within openings formed in the inner flat faces of the triangular flanges 23. The rear or inner faces of the movable shutters are preferably lined with sheets of heat insulating material 32, which may be formed of asbestos or other suitable fibrous material. The shutters 32 are adapted to slightly overlap when in the closed position, and this overlapping arrangement brings the heat insulating lining of each shutter in contact with the outer face of the succeeding shutter, and thereby effecting a closed or tight joint, as the insulating lining being fibrous possesses a substantial degree of compressibility. Further, this insulating lining of the shutters serves to prevent such shutters from radiating heat toward or from the radiator 14. The uppermost shutter 32 is arranged in contact with the upper end of the flange 23, when closed, as shown in Fig. 2, while the lower end of the flange is arranged inwardly of its upper end, so that it is adapted to be engaged by the lowermost shutter, which is arranged within the upper end of the flange 23, thereby effecting a tight joint and protecting the parts from the rain or the like.

The shutters 32 are provided with rearwardly extending cranks 33 rigidly secured thereto, and these cranks have pivotal connection, as shown at 34, with a reciprocatory link 35. This link is provided near its upper end with a horizontal link 36, rigidly secured thereto and having a longitudinal slot 37 of substantial length.

Extending longitudinally through the hood 11 is a rock shaft 38, which is suitably supported, and provided at its forward and rear ends with upstanding cranks 39 and 40. The crank 39 is provided at its upper end with a pin 41, slidable within the elongated slot 37. When the crank 39 is in the vertical or neutral position, the link 31 is in the uppermost position and the ventilators 32 will be closed.

The numeral 41 designates an ignition switch which controls the operation of the engine, in the usual manner. This switch embodies a lever 42, which may be swung to the right from the normal vertical position when starting the engine on storage batteries or the like and subsequently swung to the left beyond the neutral position for operating the engine on the magneto. A head 43 is longitudinally adjustable upon the ignition switch lever 42 and may be clamped thereto by a bolt 44. This head is carried by the rod 45, pivoted to the rear crank 40, as shown. It is thus seen that when the lever 42 is swung to the right or to the left from the normal or neutral vertical position, the link 36 will be lowered, which will effect an opening movement of the shutters 32.

An important feature of the present invention is that the radiator covering element is adapted to be placed upon the market and cut or fitted to radiators of different sizes or types and for this purpose the cover sheet 19 is preferably formed in a rectangular sheet of over size. I prefer to mark this cover sheet at different points, as indicated at 46, and these several markings indicate the way in which the cover sheet should be cut to fit radiators of different automobiles. It is obvious that these markings may be widely varied in shape and number to meet the needs of the industry.

After the cover sheet 19 has been cut upon the proper line 46, corresponding to the particular type of radiator with which it is to be used, the radiator shell may be removed from the radiator and the cover plate inserted from the rear side thereof subsequently to which the radiator shell is returned to the radiator and secured thereto, in the usual manner.

I have also found that the cover sheet may be applied to the radiator without removing the radiator shell, and to accomplish this, the cover sheet is first cut upon the proper indicating line 46 and a recess 47 is also preferably cut in the lower corner thereof. The upper end of the cover sheet and one side thereof may now be inserted beneath the flange 17 of the radiator shell, and the cover sheet may then be moved horizontally until both vertical edges thereof are beneath the flange 17. The cover sheet may then be moved vertically until the lower end of the cover sheet is positioned inwardly of the lower end of the flange 17, subsequent to which the cover sheet may be slipped downwardly so that its lower end fits behind the lower end of the flange 17. The cover sheet may now be accurately adjusted to assume the correct position and may be held in this adjustment by bolts 48 or the like engaging with a suitable portion of the radiator.

From the foregoing description, it is believed that the installation of the apparatus should be made clear, it being sufficient to state that the operation of the movable shutters is controlled by the ignition switch lever. When this ignition switch lever is in the neutral position, the shutters will remain closed, but when the ignition switch lever is shifted to either of the positions upon opposite sides of the neutral position, the shutters are opened. I also wish it understood that the invention is not necessarily restricted to the operation of the shutters by or from the ignition switch lever, as they may be operated by other means, if desired.

It is to be understood that the form of my invention herewith shown and described is to be taken as the preferred example of the same, and that various changes in the shape, size and arrangement of parts may be resorted to without departing from the spirit of the invention or the scope of the subjoined claims.

Having thus described my invention, I claim:

1. In apparatus of the character described, a sheet to cover one side of an automobile radiator and having a chamber formed thereon, said chamber being provided with a main opening and having its material at the edges of the opening rolled to provide hollow reinforcing flanges, a plurality of shutters arranged within the opening and pivoted to the flanges, and means to move the shutters.

2. In apparatus of the character described, a sheet to cover one side of an automobile radiator, a chamber carried by the sheet and provided with a main opening and having its material at the main opening rolled to form a hollow flange, a heat insulating lining arranged upon one side of the sheet and projecting into the hollow flange to be engaged by the same, a plurality of shutters arranged within the opening and connected with the hollow flange, and means to move the shutters.

3. In apparatus of the character described, a sheet to cover one side of an automobile radiator and having a laterally projecting chamber pressed therefrom, said chamber having a rolled surrounding flange providing an opening, a plurality of shutters arranged within the opening and pivoted to the flange, and means to move the shutters.

4. In apparatus of the character described, a sheet to be arranged within the shell of an automobile radiator, said sheet being provided with markings indicating the shape and size in which the sheet should be cut to fit within radiator shells of different types, a chamber carried by the sheet and having an opening, and means to cover and uncover the opening.

5. In apparatus of the character described, a sheet to be arranged within the shell of an automobile radiator, said sheet being provided with markings indicating the shape and size in which the sheet is to be cut to fit within radiator shells of different types, said sheet having a main opening, and means to cover and uncover the main opening.

In testimony whereof I affix my signature.

ROBERT L. PATE.